(12) United States Patent
Andrijic et al.

(10) Patent No.: US 12,722,689 B2
(45) Date of Patent: Sep. 1, 2026

(54) STEER-BY-WIRE SYSTEM OR SIMILAR SYSTEM

(71) Applicant: Arnold NextG GmbH, Pfronstetten (DE)

(72) Inventors: Danijel Andrijic, Albstadt (DE); Andreas Heitmann, Ruesselsheim (DE)

(73) Assignee: Arnold NextG GmbH, Pfronstetten (DE)

( * ) Notice: Subject to any disclaimer, the term of this patent is extended or adjusted under 35 U.S.C. 154(b) by 385 days.

(21) Appl. No.: 18/378,181

(22) Filed: Oct. 10, 2023

(65) Prior Publication Data

US 2024/0116560 A1 Apr. 11, 2024

(30) Foreign Application Priority Data

Oct. 11, 2022 (EP) .................................... 22200717

(51) Int. Cl.
*B62D 5/04* (2006.01)
*B62D 15/02* (2006.01)

(52) U.S. Cl.
CPC ......... *B62D 5/0409* (2013.01); *B62D 5/0421* (2013.01); *B62D 15/0215* (2013.01); *B62D 15/0225* (2013.01)

(58) Field of Classification Search
CPC ....... A61G 5/04; A61G 5/061; A61G 2203/10
See application file for complete search history.

(56) References Cited

U.S. PATENT DOCUMENTS

2005/0279562 A1* 12/2005 Hara ...................... B62D 5/003 180/443
2021/0221434 A1* 7/2021 Liu .................. B60W 60/0015

FOREIGN PATENT DOCUMENTS

DE 102020208678 A1 * 1/2022 ............... B62D 1/12
JP 2005321042 A * 11/2005
KR 102173996 B1 * 11/2020 ......... B62D 15/0205
WO WO-2006018027 A2 * 2/2006 ............... B62D 5/00

* cited by examiner

*Primary Examiner* — Jacob D Knutson
(74) *Attorney, Agent, or Firm* — Collard & Roe, P.C.

(57) ABSTRACT

A steer-by-wire system or similar system includes a first steering input device having a mechanical steering element that is connected to a shaft of a first actuator and has a first position measuring device measuring the position of the element; a second steering input device; a driving actuator for an element to be controlled by the system having a second position measuring device measuring the position of the element; and an electronic control unit receiving input signals from the first and second position measuring devices and simultaneously from the first and second input devices and providing control signals for the first actuator and the driving actuator, and handover signals from external systems. The electronic control unit calculates an output signal for the first actuator that causes the steering element to take a position that is determined by the input signal of the second input device within less than 0.1 sec.

6 Claims, 17 Drawing Sheets

| Control Algorithm Matrix, system with Force-feedback | | | |
|---|---|---|---|
| | **Control Algorithm 1** | **Control Algorithm 2** | **Control Algorithm 3** |
| **Control State 1** | **Input: P1, PF1**<br>**Output: PC (02)**<br><br>Position control of output element actuator (02) based on input (P1) from position sensor (13) on Input Device I | **Input: TF1**<br>**Output: MC1**<br><br>Torque control of actuator 12 of Input Device I, based on torgue measurement from torque sensor (03) at output element shaft (05) | **Input: P1, P2**<br>**Output: MC2**<br><br>Position control of input element actuator (22) based on input (P1) from position sensor (13) on Input Device I |
| **Control State 2** | **Input: P2, PF1**<br>**Output: PC (02)**<br><br>Position control of output element actuator (02) based on input (P2) from position sensor (23) on Input Device II | **Input: TF1**<br>**Output: MC2**<br><br>Torque control of actuator (22) of Input Device II, based on torgue measurement from torque sensor (03) at output element shaft (05) | **Input: P1, P2**<br>**Output: MC1**<br><br>Position control of input element actuator (12) based on input (P2) from position sensor (23) on Input Device II |
| **Control State 3** | **Input: AP, PF1**<br>**Output: PC (02)**<br><br>Position control of output element actuator (02) based on input (AP) from ADS (III) | **Input: -**<br>**Output: -**<br><br>OFF | **Input: AP or 04, P1, P2**<br>**Output: MC1, MC2**<br><br>Position control of input element actuators (12 & 22) based on input (04) from position sensor (03) on Output Device or on AP from APS (III) |

Figure 7

| Control Algorithm Matrix, system with Force-feedback | | | |
|---|---|---|---|
| | **Output Actuator (02)** | **Input I Actuator (12)** | **Input II Actuator (22)** |
| **Control State 1**<br><br>(User input Device I in active control) | **Input: P1, PF1**<br>**Output: PC (02)**<br><br>Position control of output element actuator (02) based on input (P1) from position sensor (13) on Input Device I | **Input: TF1**<br>**Output: MC1**<br><br>Torque control of actuator 12 of Input Device I, based on torgue measurement from torque sensor (03) at output element shaft (05) | **Input: P1, P2**<br>**Output: MC2**<br><br>Position control of input element actuator (22) based on input (P1) from position sensor (13) on Input Device I |
| **Control State 2**<br><br>(User input Device II in active control) | **Input: P2, PF1**<br>**Output: PC (02)**<br><br>Position control of output element actuator (02) based on input (P2) from position sensor (23) on Input Device II | **Input: P1, P2**<br>**Output: MC1**<br><br>Position control of input element actuator (12) based on input (P2) from position sensor (23) on Input Device II | **Input: TF1**<br>**Output: MC2**<br><br>Torque control of actuator (22) of Input Device I, based on torgue measurement from torque sensor (03) at output element shaft (05) |
| **Control State 3**<br><br>(ADS III in active control) | **Input: AP, PF1**<br>**Output: PC (02)**<br><br>Position control of output element actuator (02) based on input (AP) from ADS (III) | **Input: AP or 04, P2, (P1)**<br>**Output: MC1**<br><br>Position control of input element actuator (12) based on input (04) from position sensor (03) on Output Device or on AP from APS (III) | **Input: AP or 04, P1, (P2)**<br>**Output: MC2**<br><br>Position control of input element actuator (22) based on input (04) from position sensor (03) on Output Device or on AP from APS (III) |

Figure 8

| Control Algorithm Matrix, system using Force-forward | | | | |
|---|---|---|---|---|
| | **Control Algorithm 1** | **Control Algorithm 2** | **Control Algorithm 3** | **Control Algorithm 4** |
| **Control State 1**<br>(User input Device I in active control) | **Input: T1, (TF1)**<br>**Output: OMC**<br>Torque control of output element actuator (02) based on input torque (T1) measured by torque sensor (14) at Input Device I | **Input: PF1, (P1)**<br>**Output: MC1**<br>Position control of input element actuator (12) based on input (PF1) from position sensor (04) on output element shaft (05) | **Input: P1, (P2)**<br>**Output: MC2**<br>Position control of input element actuator (22) based on input (P1) from position sensor (13) on input device I | **Input: -**<br>**Output: -**<br>OFF |
| **Control State 2**<br>(User input Device II in active control) | **Input: T2, (TF1)**<br>**Output: OMC**<br>Torque control of output element actuator (02) based on input torque (T2) measured by torque sensor (24) at Input Device II | **Input: PF1, (P2)**<br>**Output: MC2**<br>Position control of input element actuator (22) based on input (PF1) from position sensor (04) on output element shaft (05) | **Input: P1, (P2)**<br>**Output: MC1**<br>Position control of input element actuator (12) based on input (P2) from position sensor (23) on input device II | **Input: -**<br>**Output: -**<br>OFF |
| **Control State 3**<br>(ADS III in active control) | **Input: -**<br>**Output: -**<br>OFF | **Input: PF1, (P1)**<br>**Output: MC1**<br>Position control of input element actuator (12) based on input (PF1) from position sensor (04) on output element shaft (05) | **Input: P1, (P2)**<br>**Output: MC2**<br>Position control of input element actuator (22) based on input (P1) from position sensor (13) on input device I | **Input: AP, (PF1)**<br>**Output: OMC**<br>Position control of output element actuator (02) based on input (AP) from APS (III) |

Figure 13

| Control Algorithm Matrix, system using Force-forward | | | | |
|---|---|---|---|---|
| | **Output Actuator (02)** | **Input I Actuator (12)** | **Input II Actuator (22)** | **ADS (60)** |
| **Control State 1**<br><br>(User input Device I in active control) | **Input: T1, (TF1)**<br>**Output: OMC**<br><br>Torque control of output element actuator (02) based on input torque (T1) measured by torque sensor (14) at Input Device I | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: -**<br>**Output: -**<br><br>OFF |
| **Control State 2**<br><br>(User input Device II in active control) | **Input: T2, (TF1)**<br>**Output: OMC**<br><br>Torque control of output element actuator (02) based on input torque (T2) measured by torque sensor (24) at Input Device II | **Input: P1, (P2)**<br>**Output: MC1**<br><br>Position control of input element actuator (12) based on input (P2) from position sensor (23) on input device II | **Input: PF1, (P2)**<br>**Output: MC2**<br><br>Position control of input element actuator (22) based on input (PF1) from position sensor (04) on output element shaft (05) | **Input: -**<br>**Output: -**<br><br>OFF |
| **Control State 3**<br><br>(ADS III in active control) | **Input: AP**<br>**Output: OMC**<br><br>Position control of output element actuator (02) based on input (AP) from APS (III) | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: PF1**<br>**Output: OMC**<br><br>Position feedback from output position sensor (04) |

Figure 14

| Control Algorithm Matrix, system using Force-forward | | | | |
|---|---|---|---|---|
| | **Control Algorithm 1** | **Control Algorithm 2** | **Control Algorithm 3** | **Control Algorithm 4** |
| **Control State 1**<br><br>(User input Device I in active control) | **Input: T1, (TF1)**<br>**Output: OMC**<br><br>Torque control of output element actuator (02) based on input torque (T1) measured by torque sensor (14) at Input Device I | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: -**<br>**Output: -**<br><br>OFF |
| **Control State 2**<br><br>(User input Device II in active control) | **Input: T2, (TF1)**<br>**Output: OMC**<br><br>Torque control of output element actuator (02) based on input torque (T2) measured by torque sensor (24) at Input Device II | **Input: PF1, (P2)**<br>**Output: MC2**<br><br>Position control of input element actuator (22) based on input (PF1) from position sensor (04) on output element shaft (05) | **Input: P1, (P2)**<br>**Output: MC1**<br><br>Position control of input element actuator (12) based on input (P2) from position sensor (23) on input device II | **Input: -**<br>**Output: -**<br><br>OFF |
| **Control State 3**<br><br>(ADS III in active control) | **Input: -**<br>**Output: -**<br><br>OFF | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: AP, (PF1)**<br>**Output: OMC**<br><br>Torque control of output element actuator (02) based on input (AP) from APS (III) |

Figure 15

| Control Algorithm Matrix, system using Force-forward | | | | |
|---|---|---|---|---|
| | **Output Actuator (02)** | **Input I Actuator (12)** | **Input II Actuator (22)** | **ADS (60)** |
| **Control State 1**<br><br>(User input Device I in active control) | **Input: T1, (TF1)**<br>**Output: OMC**<br><br>Torque control of output element actuator (02) based on input torque (T1) measured by torque sensor (14) at Input Device I | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: -**<br>**Output: -**<br><br>OFF |
| **Control State 2**<br><br>(User input Device II in active control) | **Input: T2, (TF1)**<br>**Output: OMC**<br><br>Torque control of output element actuator (02) based on input torque (T2) measured by torque sensor (24) at Input Device II | **Input: P1, (P2)**<br>**Output: MC1**<br><br>Position control of input element actuator (12) based on input (P2) from position sensor (23) on input device II | **Input: PF1, (P2)**<br>**Output: MC2**<br><br>Position control of input element actuator (22) based on input (PF1) from position sensor (04) on output element shaft (05) | **Input: -**<br>**Output: -**<br><br>OFF |
| **Control State 3**<br><br>(ADS III in active control) | **Input: AP**<br>**Output: OMC**<br><br>Torque control of output element actuator (02) based on input (AP) from APS (III) | **Input: PF1, (P1)**<br>**Output: MC1**<br><br>Position control of input element actuator (12) based on input (PF1) from position sensor (04) on output element shaft (05) | **Input: P1, (P2)**<br>**Output: MC2**<br><br>Position control of input element actuator (22) based on input (P1) from position sensor (13) on input device I | **Input: PF1**<br>**Output: OMC**<br><br>Torque feedback from output torque sensor (03) |

Figure 16

STEER-BY-WIRE SYSTEM OR SIMILAR SYSTEM

CROSS REFERENCE TO RELATED APPLICATIONS

Applicant claims priority under 35 U.S.C. § 119 of European Application No. 22200717.1 filed Oct. 11, 2022, the disclosure of which is incorporated by reference.

BACKGROUND OF THE INVENTION

1. Field of the Invention

There is an increasing number of steering tasks that require the control of a vehicle by more than one human and/or "virtual" driver, for example remotely controlled vehicles, cars with automated driving systems or driving school vehicles. In these cases, usually a fixed steering column is provided which synchronizes the steering of one or more human drivers and/or an automated driving system and allows the handover between them by mechanical force exchange. However, steer-by-wire systems or drive-by-wire systems can no longer rely on such a mechanical synchronization between different drivers and/or machine control inputs.

2. Description of the Related Art

The operation of vehicles for handicapped people with steer-by-wire systems often require a special driver's license. To obtain that license, training is required in a vehicle provided with dual control input devices, such as two joysticks or two steering wheels and two pedal sets.

In vehicles with dual control input devices like joysticks, steering wheels or others based on mechanical connections, both input devices are always operative and since they are mechanically connected to the controlled output device, such as a steering gear, they are always synchronized.

In steer-by-wire systems, however, there is no mechanical linkage between the control input device and the controlled output device or between dual control input devices. This presents a challenge for the handover of the control of the vehicle from one input device to the other.

If different input devices are not synchronized, a handover of the control of the vehicle from a first to a second control input device can cause an abrupt change of the behavior of the controlled element, causing a loss of stability and control of the vehicle. To avoid this problem, input devices of dual control vehicles are sometimes linked together mechanically or hydraulically.

SUMMARY OF THE INVENTION

The objective of the present invention is the introduction of a steer-by-wire system operated by two or more input devices, in which a handover of control of the vehicle from a first active control input element to a second active control element does not cause a sudden change in control output and loss of stability of the vehicle.

This objective is met by a steer-by-wire system comprising:

- a first steering input device having a mechanical steering element that is connected to a shaft of a first actuator and provided with a first position measuring device measuring the position of the element;
- a second steering input device;
- a driving actuator for an element to be controlled by the steer-by-wire system having a second position-measuring device measuring the position of the element; and
- an electronic control unit receiving input signals from the first and second position measuring devices and simultaneously from the first and second input devices and providing control signals for the first and second actuators, these control signals causing a desired torque in the shafts of the actuators or moving the shafts in a desired position, wherein the electronic control unit also receives handover signals from external systems that cause either the input signals form the first or from the second input device to be used to produce the control signal for the driving actuator. The electronic control unit calculates an output signal for the first actuator that causes the position of the steering element to correspond to a position determined by the input signal of the second input device within less than 0.1 sec.

In the system according to the invention, the positions of the first and second input devices are permanently synchronized. If the position of one input device changes the other input device is brought into the same position by the electronic control unit (ECU) with a delay of only 0.1 sec.

The first input device is configured for interaction with a human operator and has a mechanical steering element like a steering wheel or a joystick that is mechanically connected to a first motor and provided with a first position-measuring device.

The second input device can be configured in different ways.

It can be a manually operated input device like the first input device consisting of a mechanical steering element, especially a steering wheel, a joystick or a pedal, that is connected to a shaft of an actuator and that is provided with a position-measuring device.

In this embodiment with two input devices configured for interaction with a human operator, both first and second motors and first and second position measuring devices are electronically connected to the ECU. The ECU is electronically connected to a driving actuator for an element to be controlled for example a steering gear that is provided with the second position-measuring device.

In an alternative embodiment of the system, the second input device can be a control unit of an automated driving system (ADS).

In this case, where the second input device is part of an Automated Drive System ADS with a control unit able to transmit and receive electronic signals representative of positions and torque, there is no need to provide a motor or a position sensor in the second input device. In such a configuration of the invention positions measured from the first position measuring device in the first input device configured for human operator interaction is transmitted to the ECU and from the ECU to the ADS-system, such that the ADS system may take human operator input into account. When the ADS unit is in control, the position control signals from the ADS is transmitted to the ECU to enable the ECU to control the position of the driving actuator and thus the position of the controlled element. The ECU also uses the position input signal from the ADS to control the position of the first actuator connected to the first steering element, such that the position of the first input device configured for human interaction is always synchronized with the virtual position of the ADS input device.

If this synchronization is not maintained, a mismatch between position inputs from the two input devices will cause an abrupt change in position commands for the driving actuator governing the position of the controlled element when the control of the vehicle shifts from the ADS unit to the first input device configured for human interaction that may cause a loss of vehicle stability.

The ECU may be provided with inputs from sensors or systems indicating the force acting on the controlled wheel of the vehicle to allow the ECU to provide a feedback torque to the active steering input device, for example a steering wheel.

The external system requesting a handover of control to a different input device can be in its simplest embodiment a handover switch.

When the first steering input device is active, signals from the first position-measuring device are received by the ECU and used to define set point positions for controlling the driving actuator. Signals from the third position measuring device is used for controlling the actuator of the second input device. The positions measured by the first measuring device are also used by the ECU to define set points for the second steering input device and for controlling the driving actuator to ensure that the position of the second steering input device measured by its position-measuring device always corresponds to the position of the first steering input device.

If the system is provided with means for a force-feedback, the ECU also controls the first actuator to provide reaction torque on the first steering input device.

When the ECU receives a handover request for example by activation of a connected handover switch, the ECU switches from controlling the first actuator to provide a feedback torque to controlling the second actuator to provide a feedback torque if the system incorporates force-feedback.

The ECU can also switch from using the input from the first position-measuring device to define set points for the position of the second actuator to using the input of the second position-measuring device to define said set points for controlling the second actuator. In the same manner, the ECU defines set points for controlling the first actuator to ensure that the position of the first steering input device always corresponds to the position of the second steering input device.

Thus, the ECU controls the second actuator and the controlled element as well as the inactive steering input device based on the input from the active steering input device and shifts from torque control to position control of the actuator connected to the steering input device that becomes inactive when control is handed over to the other input device.

It is understood, that the steer-by-wire system described according to the invention is also open and suitable for all applications in which synchronization is necessary or may become necessary. For example, it is of high benefit if in an aircraft a synchronization according to the invention takes place at both seats in the cockpit, pilot and co-pilot, so that the flight stability of an aircraft is ensured and further improved.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 7 shows a control algorithm matrix for the input devices of the system shown in FIG. 6;

FIG. 8 shows a control algorithm matrix for the actuators of the system shown in FIG. 6;

FIG. 13 shows a control algorithm matrix for the different operating states of the system shown in FIGS. 9 to 12;

FIG. 14 shows a control algorithm matrix with regard to the control of the actuators of the different states of the system shown in FIGS. 9 to 12;

FIG. 15 shows a control algorithm matrix for the different operating states of a system shown in FIGS. 9 to 12 that also comprises an ADS;

FIG. 16 shows a control algorithm matrix with regard to the control of the actuators in the different states of the system shown in FIGS. 9 to 12 that also comprises an ADS.

DETAILED DESCRIPTION OF PREFERRED EMBODIMENTS

Figure 1A:
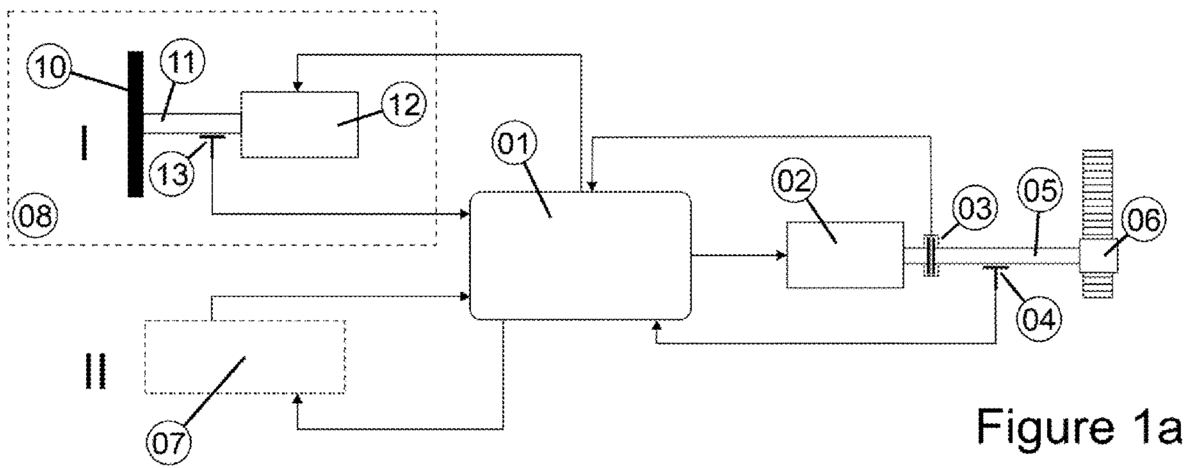
FIGS. 1A, 1B, and 1C show block diagrams of first embodiments of a steer-by-wire system.
Figure 1B:
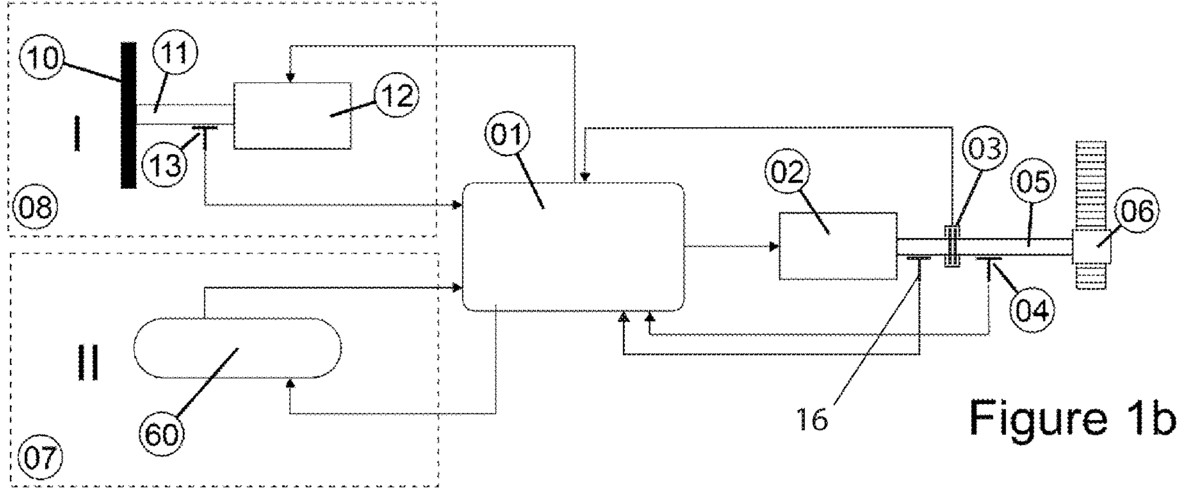
Figure 1C:
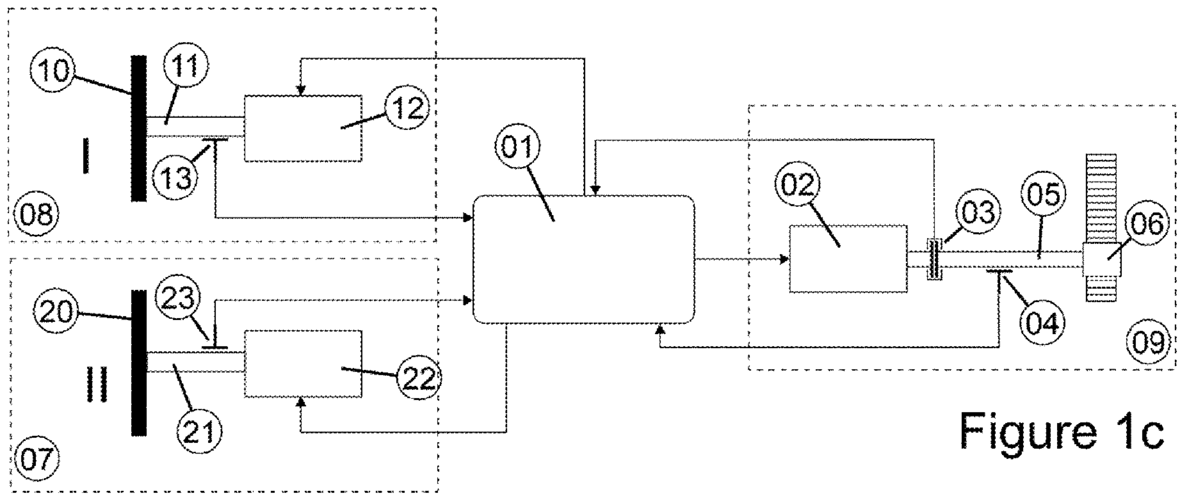

In the simplest form of the steer-by-wire system according to the invention, illustrated in FIGS. 1A, 1B, and 1C, the system is based on position forward control and force feedback and consists of a first steering input device 08 consisting of a first steering element 10 that is attached to a first rotational shaft 11 connected to a first actuator or motor 12. A first position measuring device 13 providing signals indicative of the rotational position of first shaft 11 and first steering element 10 transmits said signals from first position measuring device 13 to an Electronic Control Unit (ECU) 01. The ECU 01 is able to command first actuator 12 either to provide a specific torque in a specific direction or to drive first drive shaft 11 and first steering element 10 to a specific angular position.

The steering element 10 may be a steering wheel, a joystick or a single axis of a multi-axis joystick, a pedal, or a combination of these elements that allows a human operator to interact with the steer-by-wire system by providing control inputs and receiving a feedback.

In addition, the system can comprise a second input device 07, which may be an Automated Drive System ADS 60 in the form of a second electronic control unit for Autonomous Drive or emergency intervention and assistance ADAS, as illustrated in FIG. 1B.

The second input device 07 may also be configured as the first steering input device 08 for interaction with an operator as shown in FIG. 1C, where a second steering element 20 is attached to a second rotational shaft 21 connected to a second actuator or motor 22. A third position measuring device 23 providing signals indicative of the rotational position of the rotating unity of second shaft 21 and second steering element 20 transmits signals from the third position measuring device 23 to an Electronic Control Unit (ECU) 01. The ECU 01 is able to command the second actuator 22 to provide a specific torque either in a specific direction or to second drive shaft 21 and second steering element 20 to a specific angular position.

An operator may be a human operator or a virtual operator such as an Autonomous Drive (AD), level 4 or 5 operators or an Advanced Driver Assistance System (ADAS). The steering elements 10, 20 for a virtual operator may be a flange or other suitable element to which an actuator of the virtual operator can be attached.

A driving actuator 02, which may be an electronic motor, drives a third shaft 05 through a torque-measuring device 03. Said third shaft 05 drives an element 06 to be controlled.

In the embodiment illustrated in FIGS. 1A, 1B, and 1C, the steering element 10 may be a steering wheel or single axis joystick and the controlled element 06 in this example is a rack and pinion steering gear, actuating the controlled wheels of a vehicle, but may be any other suitable mechanical actuation mechanism.

During operation, control may be assigned to a first operator operating the first steering element 10. By manipulation of angular position of first steering element 10 and thus first shaft 11, the change of angular position of first shaft 11 is measured by first position measuring device 13. The change of position measured by first position measuring device 13 is received by the ECU 01 and used as input for two control algorithms. In this description, the term "control algorithm" is used for any control function in which a specific input from a sensor or a computer is used to calculate and command a specific output to an actuator, motor controller or a computer. A "control algorithm" may be a simple forwarding of a measured position or value from a sensor to a motor controller where it is used as a set-point, a calculation of a corresponding set-point value or a control loop where a control algorithm uses both a set-point value and a sensor input of current value to provide a control output e.g. a Proportional Integral Derivative (PID) control loop.

The first control algorithm controls actuator 02 to drive third shaft 05 to a position corresponding to the position measured by first position measuring device 13, using the positions measured by first and second position measuring devices 13 and 04 as inputs for the first control algorithm. Thereby, the operator's control input has been executed and the controlled element has been brought to the position commanded by the operator. The torque exerted by actuator 02 to obtain the required change of position of the controlled element 06 is measured by torque sensor 03 and used by the ECU 01 to control the reaction torque to be exerted by the first actuator 12 to provide force-feedback to the first steering element 10 through first shaft 11. A further position-measuring device 16 is provided between the torque sensor 03 and the driving actuator 02.

The second control algorithm controls actuator 22 to drive second shaft 21 to the same rotational position as the first shaft 11, using the readings of first and third position measuring devices 13 and 23 as inputs for the second control algorithm, ensuring the position of second control input element 20 always corresponds to the position of first steering element 10. If control is at some time assigned to a second operator operating the second control element 20, continuity in control input and thus in control output is thus ensured since the first measured control input position measured by third position measuring device 23 will be identical to the last measured control input measured by first position measuring device 13. Sudden, unexpected changes in the behavior of the vehicle is prevented.

When control is switched from a first operator operating the first steering element 10 to a second operator operating the second control element 20, the ECU shifts to using measurements from third position measuring 23 and second position measuring device 04 as inputs for the first control algorithm controlling the actuator 02 driving the controlled element 06. The torque measured by the torque sensor 03 is then used to control the feedback torque provided by actuator 22 to the second operator through control input element 20. The ECU 01 also changes the second control algorithm from using the measurements from first and third position measuring devices 13 and 23 to control the second actuator 22 by driving the second shaft 21 and second control input element 20 to a position identical to the position of the first steering element 10, to instead controlling the first actuator/motor 12 to ensure that the first shaft 11 and the first steering element 10 are always in a position corresponding to the position of the steering element 20.

It should be understood that more than two steering input devices like the first steering input device 08, consisting of a steering element 10, a shaft 11, an actuator/motor 12 and a position measuring device 13 can be provided to allow for more than two operators. It should also be understood that in the given example allowing two operators to provide input for lateral control of a vehicle through interaction with a steering wheel or one axis of a joystick, two additional input channels providing control input interaction through pedals, or a second joystick axis would allow the ECU to control a second output device 09.

Figure 2:
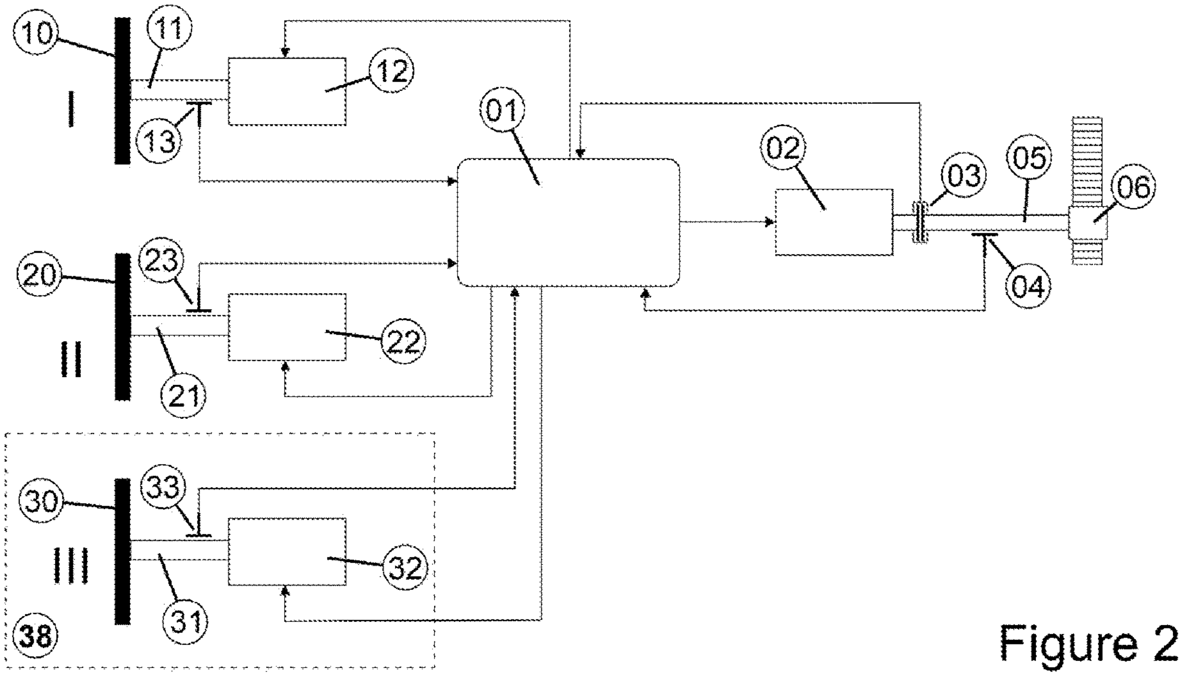
FIG. 2 shows a block diagram of an embodiment of a steer-by-wire system with three input devices.

In FIG. 2 a system with three control input devices I-III is illustrated, wherein the third control input device 38 consists of a third steering element 30 attached to a third rotational shaft 31 that is connected to a third actuator or motor 32. A third position measuring device 33 is providing signals indicative of the rotational position of the rotating unit consisting of third shaft 31 and third steering element 30, and transmits these signals to the ECU 01. The ECU 01 is able to command a third actuator 32 either to provide a specific torque in a specific direction or to drive shaft 31 and third steering element 30 to a specific angular position. Such a configuration allows the use of a third-party ADAS system by rendering the system interface mechanical or providing a compatible electrical signal interface. This configuration also allows the operator of a tele-operation system to take control of the vehicle. In the latter case, some of the shown signals between input device III and the ECU 01 are transmitted wirelessly.

Figure 3:
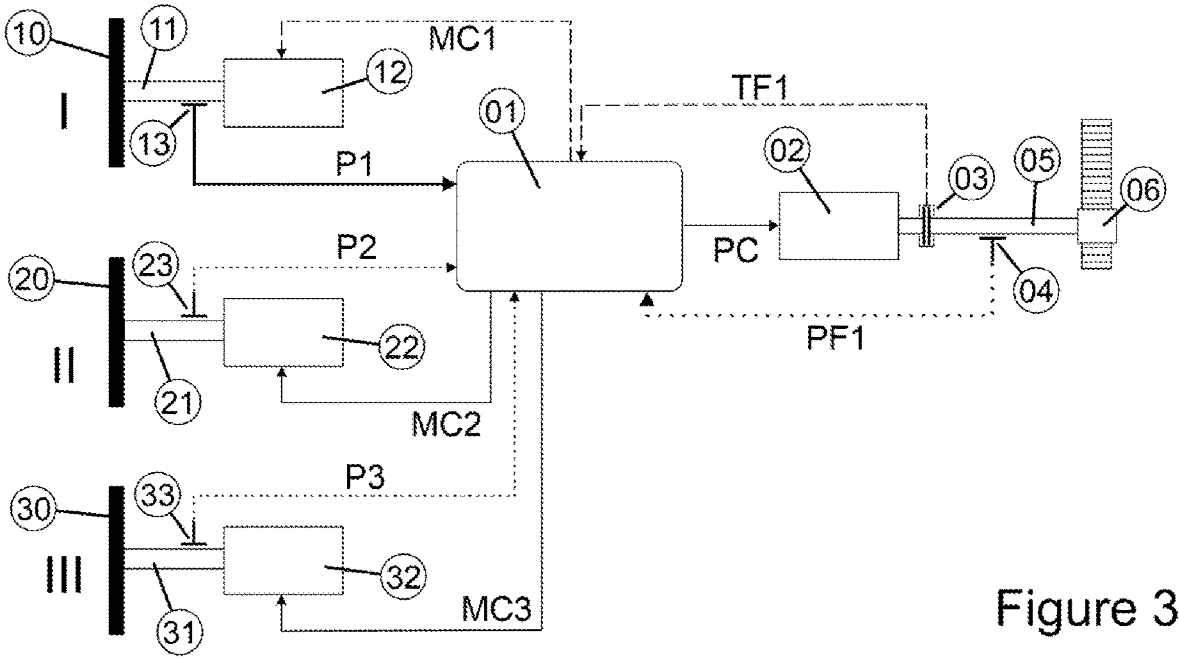
FIGS. 3, 4, and 5 show block diagrams of the system of FIG. 2 in different states.

In FIG. 3, the control system is shown in a first state, in which the first control input device I is the active, while second and third control input devices II and III are passive. The first control algorithm uses the position of the steering element 10/rotational shaft 11 measured by the first position-measuring device 13 as the controlling input illustrated by a full line P1. The ECU 01 uses the input P1 to control the position of the actuator 02 of the output device and thus the position of the controlled element 06 by forwarding a position control signal PC to the actuator 02. A position feedback signal PF1 is fed back from the position-measuring device 04 of the output shaft 05 to the ECU as part of the control of the actuator 02 of the output device. In FIG. 3, position feedback signals are shown with dotted lines. Torque feedback and torque control signals are shown with dashed lines, as with the torque feedback signal TF1 from the torque sensor 03 to the ECU 01 allowing a second control algorithm in the ECU 01 to forward a torque feedback actuator control signal MC1 to the first actuator 12 of the control input device I being in active control.

The controlling input signal P1 is also used as an input for a third and a fourth control algorithm. In the third control algorithm, the position control input P1 is used with the position feedback signal P2 from the position sensor 21 of the second control input device II by the ECU 01 to provide an actuator position control signal MC2 to ensure correspondence between the positions of steering element 10 and steering input element 20.

In the fourth control algorithm, the position control input P1 is used with the position feedback signal P3 from the position sensor 31 of the third control input device III by the ECU 01 to provide an actuator position control signal MC3 to ensure correspondence between the positions of steering element 10 and steering input element 30.

Figure 4:
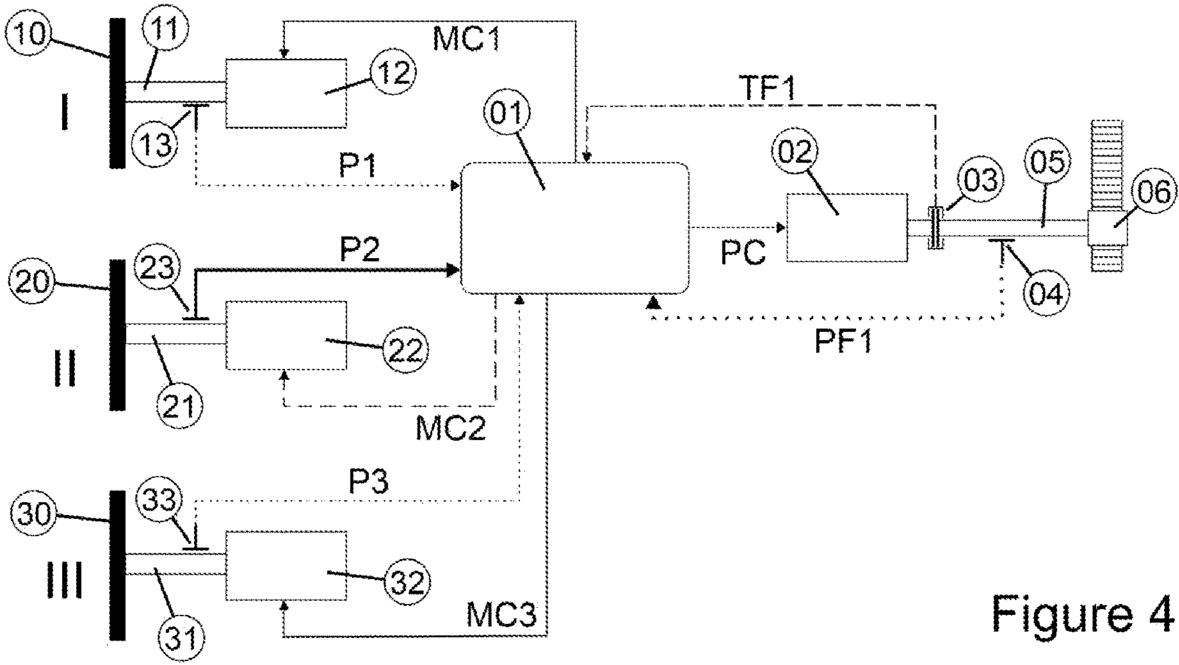

When control is shifted from control input device I to control input device II, the systems switch into a second state, illustrated in FIG. 4. In this state, the measured position P2 from the position sensor 21 of control input device II is used as input for the controller by the ECU 01 for controlling the position of the controlled element 06 measured by the position-measuring device 04. The actuator control signal MC2 provided by the ECU 01 for the actuator 22 of input device II then becomes a torque control signal, whereas the actuator control signal MC1 for the first actuator 12 of input device I shifts from a torque control signal to a position control signal, to ensure position of steering element 10 of input device I corresponds to the position of control input element 20 of control input device II.

Figure 5:
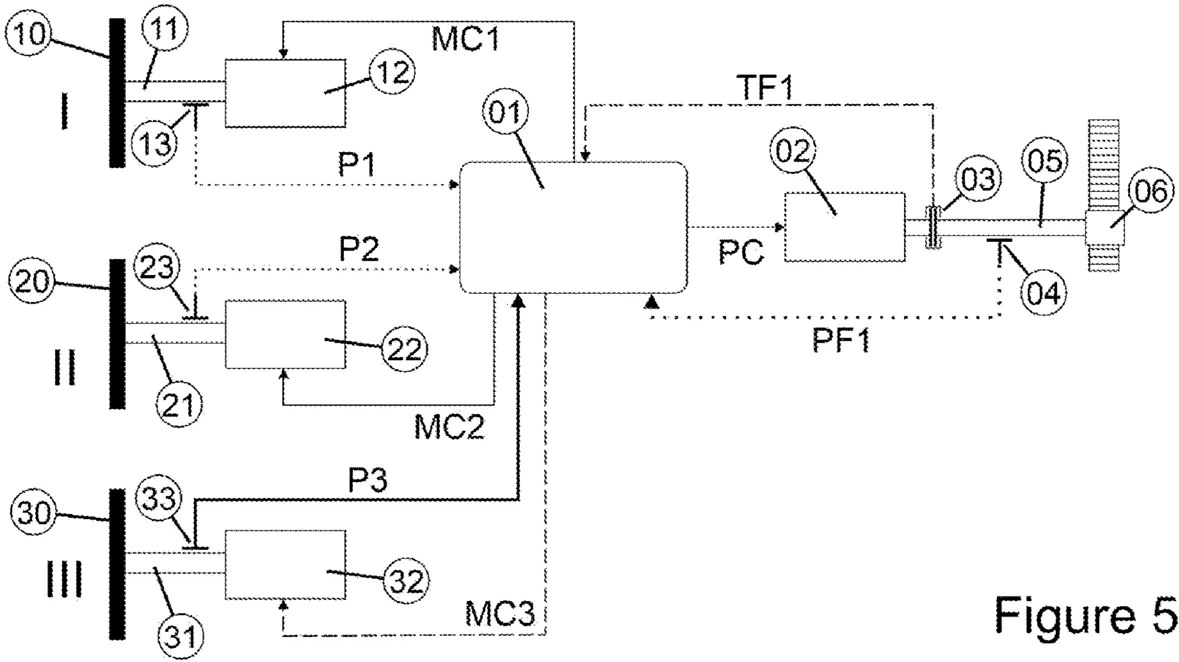

Switching to a third state of the system, in which control input device III is the active control input device, is illustrated in FIG. 5, where the active position input P3 is shown in full line, whereas the position feedbacks P2, P3 from input devices I and II are shown in dotted lines.

Figure 6:
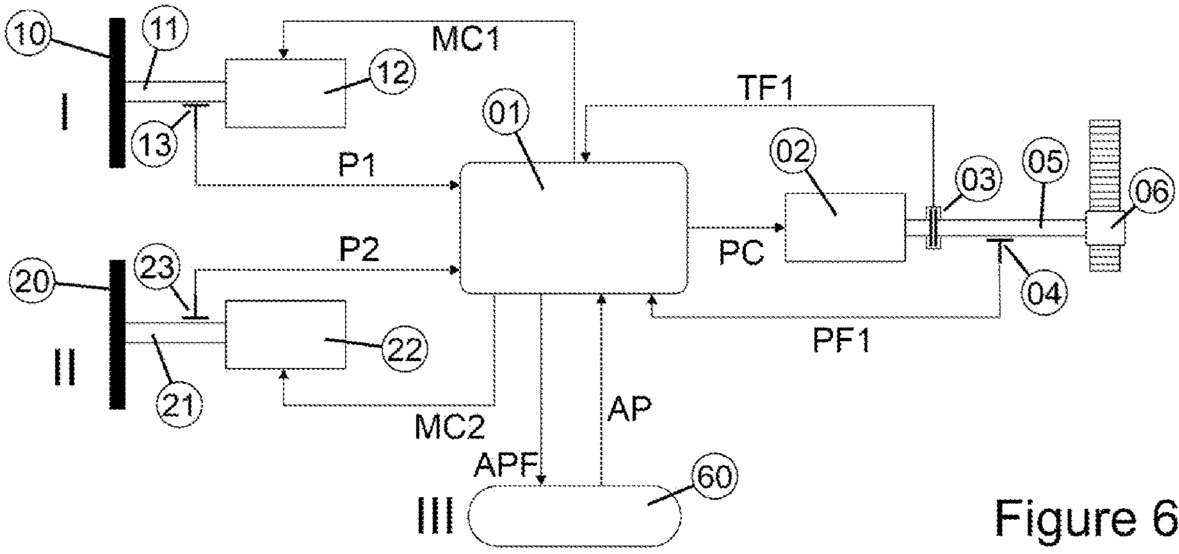
FIG. 6 shows a block diagram of a system with two input devices and an automated drive system.

In FIG. 6 a system with two operator input devices I and II and an automated drive system 60 is shown. The automated drive system may be an autonomous drive system level 4 or 5 or an ADAS Advanced Driver Assistance System. A force feedback is normally not considered relevant to automated drive systems and in the embodiment illustrated in FIG. 6, the positions measured by the position measuring device 04 on shaft 05 or directly on the controlled element 06 are transmitted to the ECU 01 and relayed to the Automated Drive System 60 at all times, regardless of which input device is active. However, although physical force feedback is normally not relevant to automated drive systems, a virtual force forward that represents the amount of force or toque exerted by a human operator may be relevant for automated drive systems such as ADAS especially for detecting a driver input and a takeover by the driver. When the driver starts to apply torque the ADAS reduces its own torque gradually to enable a smooth transition. And in case of evasive steering, the driver input torque can trigger an ADAS maneuver.

Virtual force feedback i.e. input representing the amount of force or torque acting on the controlled element may also be relevant for automated drive systems, since ADAS can use either position- or torque-control or both as described above for evasive steering.

It should be understood by a person skilled in the art, that virtual force forward and force feedback to and from an automated drive system may be introduced by adding communication of such signals between the ECU 01 and the automated drive system 60, or the described communication between the two units 01 and 60 based on position measurement values may be substituted by communication based on force- or torque-measurement values.

It should also be understood that multiple automated drive systems, such as a level 4 or 5 autonomous drive system combined with one or more ADASs, can be used by the system, despite only a single automated drive system is illustrated in the present example.

When the Automated Drive System ADS 60 becomes the active control input device, set point positions are transmitted from the ADS-unit 60 to the ECU 01 to allow the ECU 01 to control the driving actuator 02 to drive the controlled element 06 to these set-point positions delivered by the ADS 60. The ECU 01 may use the position inputs from the ADS 60 or the data from the position measuring device 04 at the controlled element 06 to command the motors/actuators 12, 22 of the steering input devices I and II to positions corresponding to the positions received from the ADS-unit 60.

An overview of the control algorithms in the different states of the system illustrated in FIG. 6 is provided in FIG. 7.

An overview of how each actuator is controlled in the different states of the system illustrated in FIG. 6 is provided in FIG. 8.

Figure 9:
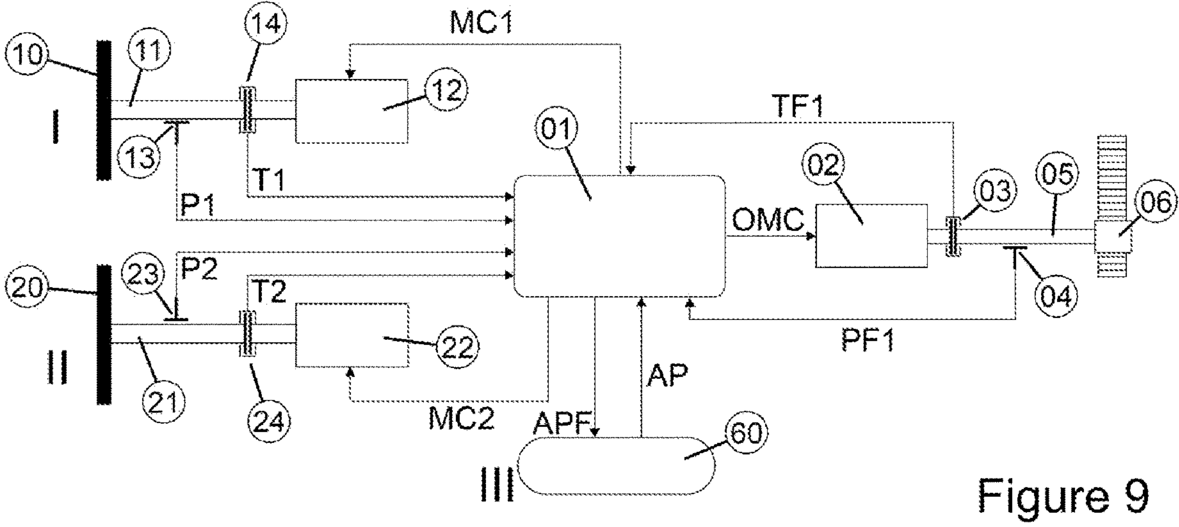
FIG. 9 shows a block diagram of a system with a torque sensor.

In a further embodiment, a torque sensor 14, 24 is implemented between the motors/actuator 12, 22 and the position measuring devices 13, 23 of each of the input devices I and II as illustrated in FIG. 9. In this embodiment, the system can be operated as the embodiment shown in FIG. 6, using position forwarding and force-feedback to the active control input device, wherein the torque sensor is used to provide feedback for the force-feedback actuation control algorithm of the ECU 01. However, this embodiment as illustrated in FIG. 8 may also be used in a force-forward control system. If it is used in a force-forward system, the torque exerted on the steering element 10 of input device I is measured by a torque sensor 14 on the shaft 11 between the first position measuring device 13 and the first actuator 12.

Figure 10:
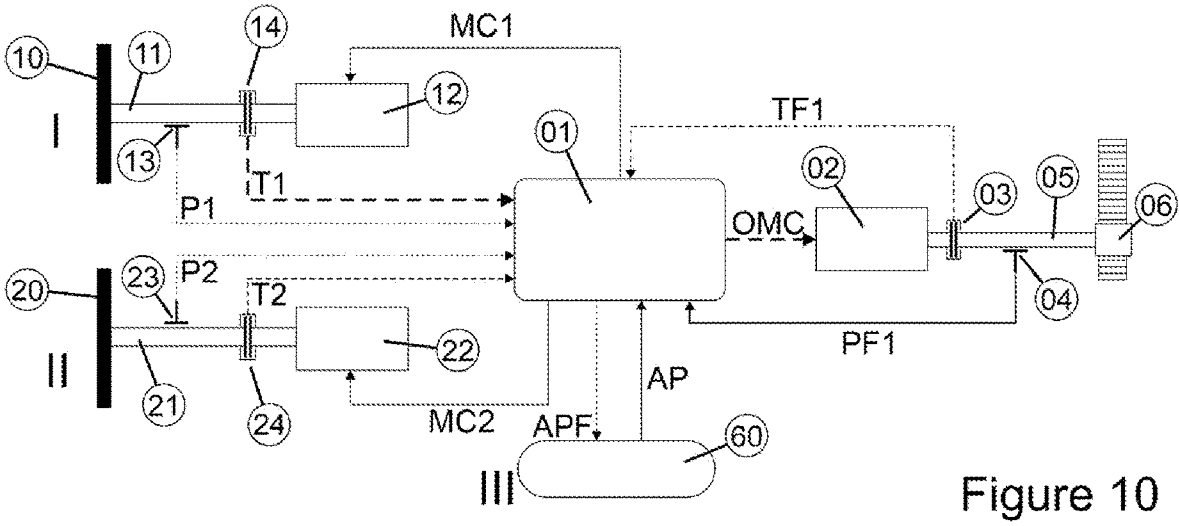
FIGS. 10, 11, and 12 show block diagrams of the system of FIG. 9 in different states.

When in a first state, in which control input device I is active, as illustrated in FIG. 10, according to a first control algorithm, the torque T1 measured by torque sensor 14 is forwarded to the ECU 01, where it is used to generate a control signal OMC for the driving actuator 02, causing the actuator 02 to exert a corresponding torque onto shaft 05 and thus on the controlled element 06. A torque sensor 03 may be arranged between the actuator 02 and the position-measuring device 04 as an input for a torque control loop in the ECU 01 but may also be omitted if torque control of actuator 02 is sufficiently accurate. In a second control algorithm, the change in position of the controlled element 06 from the applied torque by the actuator 02 is measured by the position-measuring device 04 and transmitted to the ECU 01. The ECU 01 uses the position feedback signal PF1 to command MC1 the first actuator 12 to drive the steering elements 10 to a position corresponding to the position PF1 of the controlled element 06.

A third control algorithm in the ECU 01 uses the measured position P1 from position measuring device 13 to provide a motor control signal MC2 for the actuator 22 to drive steering element 20 to a position corresponding to the position of steering element 10.

Figure 11:
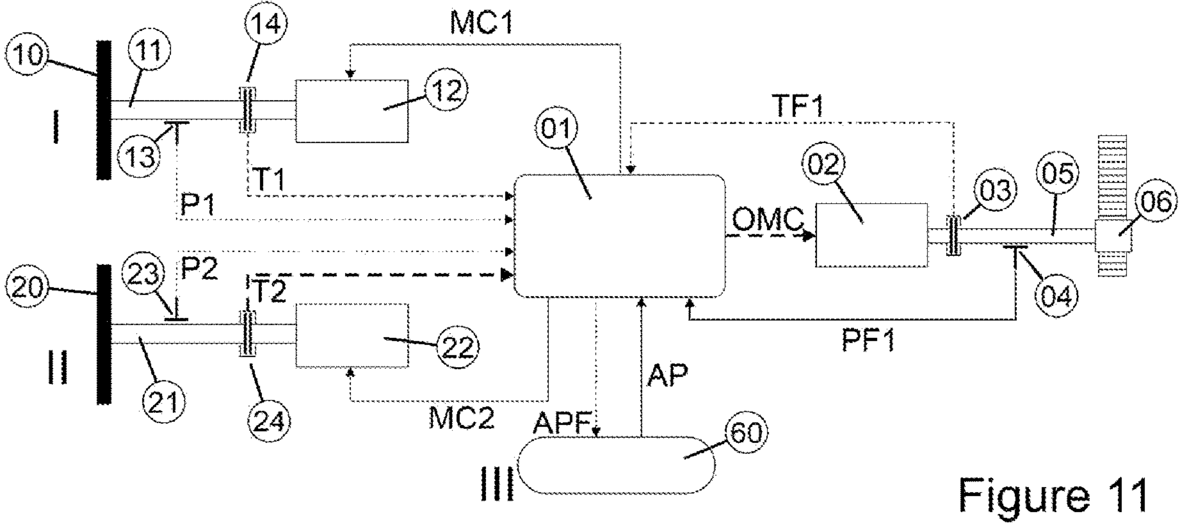

When the system switches to a second state, in which control is handed over to control input device II, as illustrated in FIG. 11, the third control algorithm reverses and the ECU now uses the measured position P2 from position measuring device 23 to provide a first actuator 12 with a motor control signal MC1 to bring steering element 10 into a position corresponding to the position of steering element 20, and thus keeping the two steering elements 10 and 20 of the input devices I and II synchronized.

In the first control algorithm, the ECU 01 uses the measured torque T2 as input to provide the driving actuator 02 with an output motor control signal OMC that causes the driving actuator 02 to apply that torque onto shaft 05 wherein ECU 01 may use a feedback from a torque sensor 03 if present in the system.

The second control algorithm in the ECU 01 uses the position PF1 of the controlled element 06 transmitted by position measuring device 04 as well as the position P2 transmitted by position measuring device 23 to provide a motor control signal MC2 for actuator 22 to ensure that steering element 20 is always in a position corresponding to the position of the controlled element 06.

Figure 12:
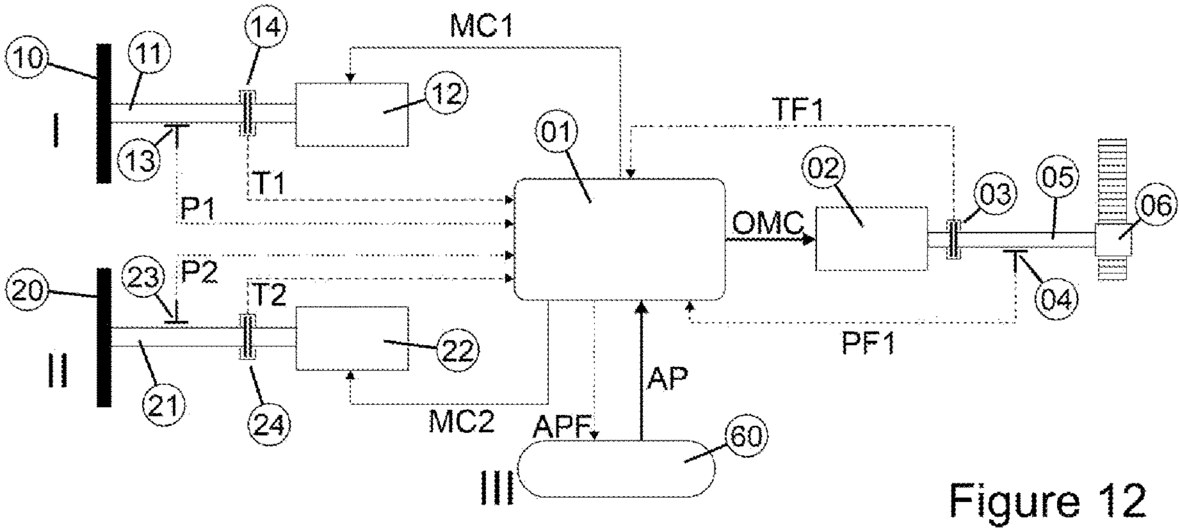

When the system switches to a third state, where control is handed over to an automated Drive System or ADAS 60, as illustrated in FIG. 12, a fourth control algorithm in the ECU 01 uses virtual position inputs AP from the ADS 60 to provide position control input OMC for the driving actuator 02, using feedback from the position measuring device 04.

In the first control algorithm, the torque control algorithm is disabled and the second control algorithm in the ECU 01 uses the position PF1 of the controlled element 06 transmitted by position measuring device 04 to provide a position motor control signal P1 or P2 to one of the motors/actuators 12 or 22. It may be the actuator of the control input device with the highest priority or the actuator last in active control to ensure the position of the selected steering element 10 or 20 corresponds to the position of the controlled element 06.

The third control algorithm in the ECU 01 uses position P1 or P2 of the input device I or II depending on which actuator 12 or 22 was selected for being moved into a position corresponding to the position of the controlled element 06 to control the non-selected actuator in the second control algorithm to synchronize the position of its steering element with the position of the steering element selected by the second control algorithm.

An overview of the control algorithms in the different states of the system illustrated in FIGS. 9-12 is provided in FIG. 13.

An overview of how each actuator is controlled in the different states of the system illustrated in FIGS. 9-12 is provided in FIG. 14.

A system as illustrated in FIGS. 9-12 may also comprise an automated drive system 60 based on torque input from torque sensors 03, 14 and 24 and use torque control of driving actuator 02. An overview of the corresponding control algorithms and the control of the actuators in each state for such a system is shown in FIGS. 15 and 16.

During the operation of the system, all measuring devices are always active and in communication with the ECU, but the ECU uses their input data selectively according to the different control algorithms to provide different output signals. The state of the system determines which combination of control algorithms are applied in a given situation and is controlled by what is commonly referred to as a "state machine", which is a software code defining which control algorithms to apply in different states of the system and which events trigger a change of state of the system. Examples of events used to trigger a change of state could be activation of a hand-over switch, a trigger signal from an ADAS, a sensor value exceeding a specified value or a sensor value outside a valid range indicating a faulty sensor or sub-system failing.

Figure 17:
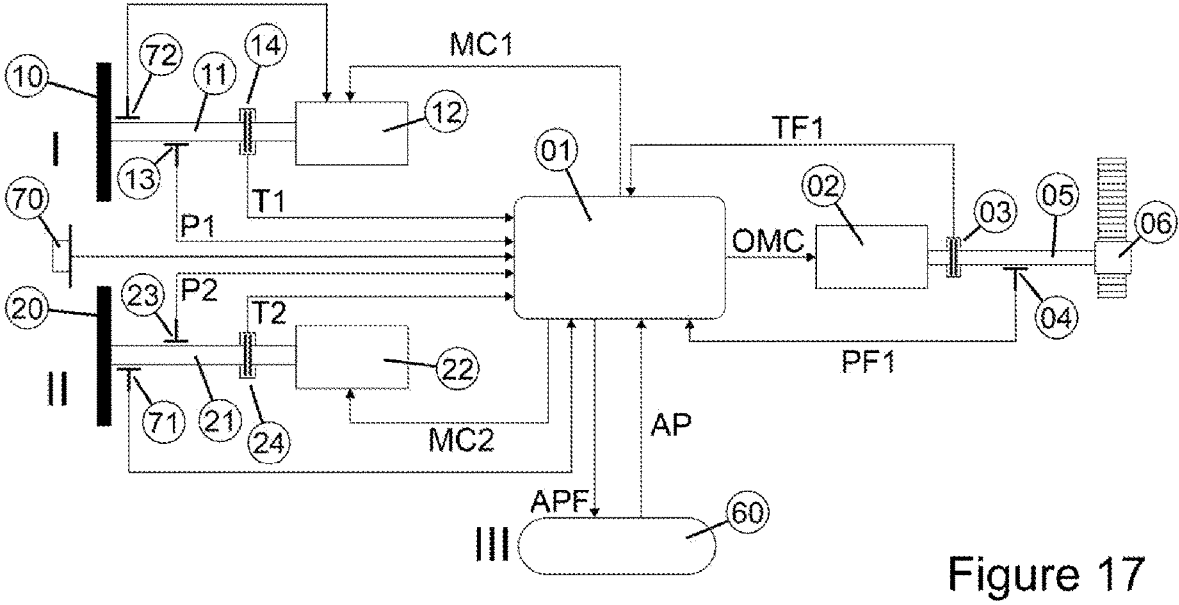
FIG. 17 shows a block diagram of a system with a handover switch.

A system incorporating a handover switch 70 is illustrated in FIG. 17.

The state machine may also change the state of the system depending on hand-over requests in a prioritized arbitration system. Such an arbitration system can be based on either active or passive prioritizing, where passive prioritizing means that the system does not change its state unless a hand-over request activates a change and active prioritizing means that the system may change its state and allocate control to an operator with a higher priority if none of the lower priority input devices actively requests control.

Although only a few embodiments of the present invention have been shown and described, it is to be understood that many changes and modifications may be made thereunto without departing from the spirit and scope of the invention.

What is claimed is:

1. A steering system comprising:

a first steering input device (08) having a mechanical steering element (10) that is connected to a shaft (11) of a first actuator (12) and provided with a first position measuring device (13) measuring the position of the mechanical steering element (10);

a second steering input device (07);

a driving actuator (02) for an element (06) to be controlled by the steering system having a second position measuring device (04) measuring a position of the element (06) to be controlled;

an electronic control unit (01) receiving input signals from the first and second position measuring devices (13, 04) and simultaneously from the first and second steering input devices (08, 07) and providing control signals for the first actuator (12) and the driving actuator (02), these control signals causing a desired torque in the shafts (11, 05) of the actuators (12, 02) or moving the shafts (11, 05) in a desired position, wherein said electronic control unit (01) also receives handover signals from external systems that cause either the input signals from the first (08) or from the second input device (07) to be used to produce the control signal for the driving actuator (02), wherein the electronic control unit (01) calculates an output signal for the first actuator (12) that causes the steering element (10) to take a position that is determined by the input signal of the second input device (07) within less than 0.1 sec, wherein a torque sensor (03) is provided between the second position-measuring device (04) and the driving actuator (02) connected to the controlled element (06) and wherein a further position-measuring device is provided between the torque sensor (03) and the driving actuator (02).

2. The system according to claim 1, wherein the second input device (07) is a manually operated input device consisting of a second mechanical steering element (20) in the form of a steering wheel, a joystick or a pedal, that is connected to a shaft (21) of a second actuator (22) and that is provided with a third position measuring device (23).

3. The system according to claim 1, wherein the second input device (07) is a control unit of an automated driving system.

4. The system according to claim 1, further comprising at least one additional input device, and wherein a position of all input devices are synchronized with each other by the electronic control unit (01) within less than 0.1 sec.

5. The system according to claim 1, wherein the actuator (02) is a linear actuator.

6. A steering system comprising:

a first steering input device (08) having a mechanical steering element (10) that is connected to a shaft (11) of a first actuator (12) and provided with a first position measuring device (13) measuring the position of the mechanical steering element (10);

a second steering input device (07);

a driving actuator (02) for an element (06) to be controlled by the steering system having a second position measuring device (04) measuring a position of the element (06) to be controlled;

an electronic control unit (01) receiving input signals from the first and second position measuring devices (13, 04) and simultaneously from the first and second steering input devices (08, 07) and providing control signals for the first actuator (12) and the driving actuator (02), these control signals causing a desired torque in the shafts (11, 05) of the actuators (12, 02) or moving the shafts (11, 05) in a desired position, wherein said electronic control unit (01) also receives handover signals from external systems that cause either the input signals from the first (08) or from the second input device (07) to be used to produce the control signal for the driving actuator (02), wherein the electronic control unit (01) calculates an output signal for the first actuator (12) that causes the steering element (10) to take a position that is determined by the input signal of the second input device (07) within less than 0.1 sec, wherein a force sensor is provided between the second position-measuring device (04) and the driving actuator (02) connected to the controlled element (06) and wherein a further position-measuring device is provided between the force sensor and the driving actuator (02).

* * * * *